United States Patent [19]
Puranik et al.

[11] Patent Number: 6,143,849
[45] Date of Patent: *Nov. 7, 2000

[54] SYNTHESIS OF ACRYLATE AND ALKYL ACRYLATE MONOMERS AND POLYMERS OF CHELATORS

[75] Inventors: Dhananjay B. Puranik, Alexandria, Va.; Eddie L. Chang, Silver Spring, Md.

[73] Assignee: The United States of America as represented by the Secretary of the Navy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,172

[22] Filed: Nov. 27, 1996

[51] Int. Cl.[7] .................................................... C08F 26/06

[52] U.S. Cl. ........................... 526/261; 521/32; 526/304; 526/307; 526/311; 526/312

[58] Field of Search ................................ 526/261, 304, 526/307, 311, 312; 521/32

[56] References Cited

U.S. PATENT DOCUMENTS

| | | | |
|---|---|---|---|
| 4,174,428 | 11/1979 | Tabushi et al. | 526/261 |
| 4,423,158 | 12/1983 | Porath | 521/32 |
| 4,728,696 | 3/1988 | Van Phung et al. | 526/304 |
| 4,994,560 | 2/1991 | Kruper, Jr. et al. | 534/10 |
| 5,141,966 | 8/1992 | Porath | 521/32 |
| 5,739,178 | 4/1998 | Powell et al. | 526/312 |

OTHER PUBLICATIONS

Blain et al., *Analytica Chimica Acta*, 232 (1990) 331–336.
Louvet et al., *Tetrahedron Letters*, vol. 23 (1982) 2445–2448.

*Primary Examiner*—Bernard Lipman
*Attorney, Agent, or Firm*—Barry A. Edelberg; Romulo H. Delmendo

[57] ABSTRACT

Multifunctional chelating groups are covalently bound to acrylate or methacrylate monomers. These monomers are polymerized. The resulting polymers are highly substituted with chelating groups and are useful for removing metals from fluids such as liquid hydrocarbons. An example of a polymer according to this invention has the following structure:

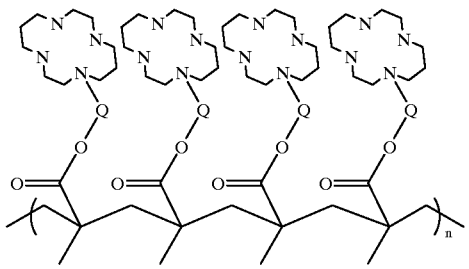

wherein Q is a saturated or unsaturated aliphatic group having 1 to about 200 carbon atoms and is typically an unsubstituted unbranched alkylene, a substituted unbranched alkylene, a substituted branched alkylene, or an unsubstituted branched alkylene, and $n$ is an integer having a value of at least 1.

6 Claims, No Drawings

SYNTHESIS OF ACRYLATE AND ALKYL ACRYLATE MONOMERS AND POLYMERS OF CHELATORS

BACKGROUND OF THE INVENTION

1. Field of the Invention

The present invention relates generally to chelators and more specifically to the chelators attached to polymers.

2. Description of the Background Art

In many liquids, such as jet fuel, the presence of even ppm concentrations of metals such as Cu significantly reduces the thermal stability and performance of the liquid. Soluble chelators are commonly used for tying up these in liquids such as fuels.

A better approach is to remove the metal from fuel or other liquids by immobilizing the chelator-metal complex to a stationary phase. This removal may be accomplished by using a chelator bound to a polymer backbone. Previously, crown ethers and cryptand chelators have been immobilized on polystyrene. This immobilization has been typically performed by solid-phase reactions between the crown ether or cryptand chelator and the activated polymer. In these reactions, however, many modifiable sites on the polymer remain unsubstituted with chelator. Therefore, the polymer bearing the immobilized chelators provides a less than optimal concentration of bound chelators. This low substitution may be attributed to the inaccessibility of some of the reaction sites and the inability of the chelator, due to its molecular size or reaction conditions, to penetrate the polymer.

SUMMARY OF THE INVENTION

Accordingly, it is an object of the present invention to enhance the removal of metals from an aqueous or non-aqueous liquid.

Another object of the present invention is to obtain a polymer highly substituted with a chelator.

It is a further object of at least one aspect of the present invention to remove copper from liquids.

These and additional objects of the invention are accomplished by covalently bonding multifunctional chelating groups to alkyl acrylate or acrylate monomers and then either homopolymerizing the monomers, or polymerizing the monomers with analogous monomers differing in carbon chain length or substitution on the carbon chain, to form an acrylate or alkyl acrylate polymer. The carbon chains on the monomers may be straight or unbranched, substituted or unsubstituted.

DESCRIPTION OF THE PREFERRED EMBODIMENTS

A generalized synthesis for preparing monomers and polymers according to the present invention is provided below:

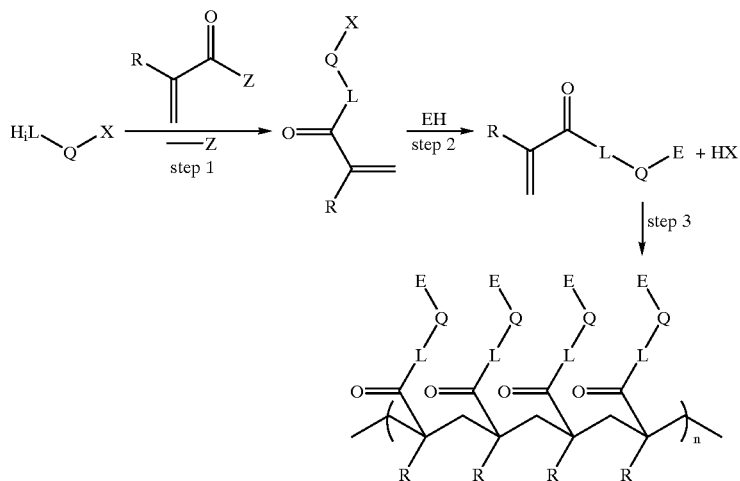

where E is a multifunctional chelating group having at least two coordination sites; L is oxygen, nitrogen, or sulfur; Q is a saturated or unsaturated aliphatic group having 1 to about 200 carbon atoms and is typically an unsubstituted unbranched alkylene, a substituted unbranched alkylene, a substituted branched alkylene, or an unsubstituted branched alkylene; i is sufficient to provide electrical neutrality, and is typically one when L is oxygen or sulfur and two when L is nitrogen; R may be hydrogen or any branched or unbranched hydrocarbon group, and may be substituted or unsubstituted provided that any substitution does not significantly interfere with the required reactivity of the Z terminus with the $H_iL$ terminus and thus greatly reduce the yield from step 1; X is a leaving group such as halide (typically Br, I, or Cl), acetate, brosylate, tosylate, nosylate, azide, nitrate, and carbonate; Z is a leaving group such as halide (typically Br, I, or Cl), acetate, brosylate, tosylate, nosylate, azide, nitrate, and carbonate, and may be the same as or different from X; and $n$ is an integer having a value of at least 1. $n$ may be arbitrarily large. Typically, R is a methyl, ethyl, or propyl group.

Often, but not necessarily, E is heterocyclic and includes about 4 metal coordination sites. Each coordination site is typically a heteroatom, such as S, N, or O, and, at each side, is joined to its neighboring coordination site by a alkylene bridge of about 1 to 100 carbons.

Typical compounds for EH include the following: diethylenetriamine, triethylenetetraamine,

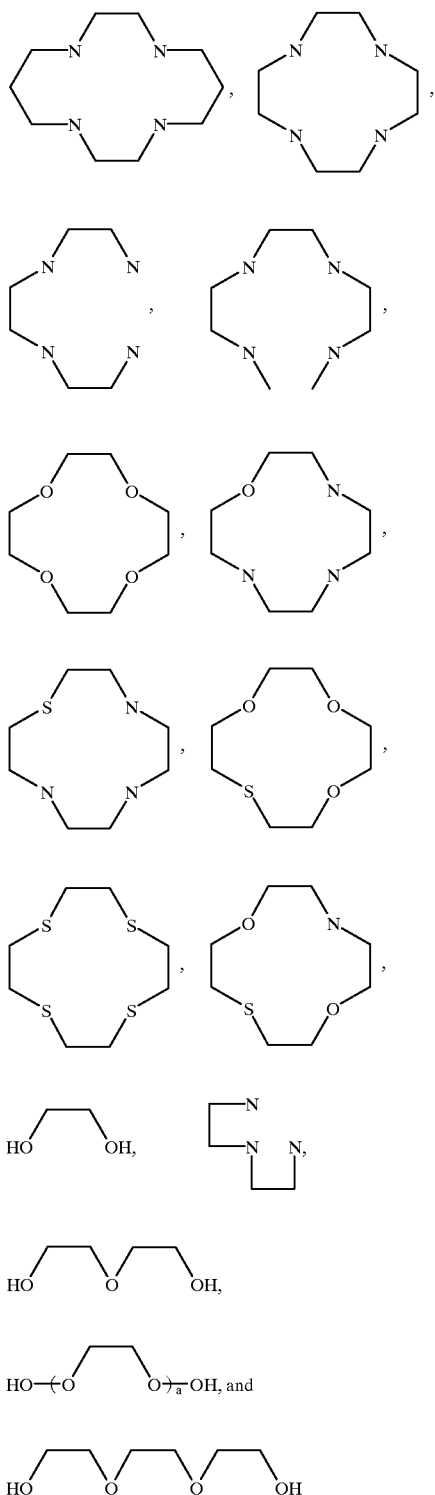

where a is an integer equal to or greater than one and may be arbitrarily large provided that the reactant has the required solubility in the reaction system(s). Typically, a is an integer of from 1 to $10^8$. In each of the heterocycles shown above, the each heterocyclic metal coordination site is joined, on each side, to its neighboring heterocyclic metal coordination site by an alkylene bridge of two carbon atoms, thus forming a macrocycle. To avoid clutter, hydrogens needs to satisfy electrical neutrality and valence demands, of not shown, are implied in the structures included in the present specification and the claims that follow.

The reaction in step 1 is an esterification reaction and may be performed under any conditions appropriate for esterification reactions between the specified classes of reactants. Step 2 is an SN2 substitution reaction and may be performed under any conditions appropriate for SN2 reaction between the specified classes of components.

Typically, steps 1 and 2 are performed while all reactants are together in solution. The solvent system used for those reactions may be aqueous or non-aqueous, protic or aprotic. Solvents for these two reaction steps may, for example, be halocarbons; ethers; polyethers; substituted pyridines; unsubstituted pyridines; aromatic solvents such as benzene, toluene and napthalene; alcohols; water; and mixtures thereof.

The polymerization reaction of step 3 may be performed under any conditions suitable for such polymerization. Generally, this reaction is carried out as a free radical initiated polymerization in a solvent system. However, other polymerization mechanisms, such a cation or anion-initiated polymerization, cross-linking ionization, radiation curing, and thermal curing, may be used. Where polymerization step 3 is performed in solution, solvent systems suitable for steps 1 and/or step 2 are also suitable for polymerization step 3.

Typically, the reactants in step 1 may be present in about a 1:1 molar ratio. This ratio, although not necessary, provides complete reaction (75% to about 95% yield), avoids waste that might arise at other ratios, and eliminates any need to remove unreacted components. Step two generally proceeds to about 70% to 80% yield of the desired monosubstituted product when a one to one molar ratio of the esterified reaction product of step one and EH. Typically, the ratio of EH to the esterified reaction product of step 1 is about 1:1 to about 100:1. Overabundance of the esterified reaction product of step 1 with respect to EH may lead to di- or higher-substitution of EH and a need for subsequent separation of the desired monosubstituted from its more highly substituted analogs before polymerization. Step 3 is a homopolymerization of the monosubstituted product of step 2. Rather than homopolymerization, polymerization can occur with analogs of differing carbon chain length and/or substituents on the carbon chain. The value of *n* may be controlled, in a well-known manner, by selection of appropriate modes of polymerization and the quantity of polymerization initiator used.

The reaction temperature during steps 1, 2, and 3 is not critical. Typically, these reactions may be performed at $-100°$ C. to about $+1000°$ C. More often, these reactions are performed at about $-100°$ C. to about $200°$ C. Typically, reactions 1, 2, and/or 3 are performed at room temperature.

Steps 1, 2, and 3 may be performed at any reasonable pressure. Generally, these steps can be performed at $10^{-6}$ mmHg to about 1000 atm. Typically, these steps are performed at room temperature. In each of steps 1, 2, and 3, the absolute concentrations of the reactants are not critical.

A typical procedure for forming a polymer according to the present invention appears below:

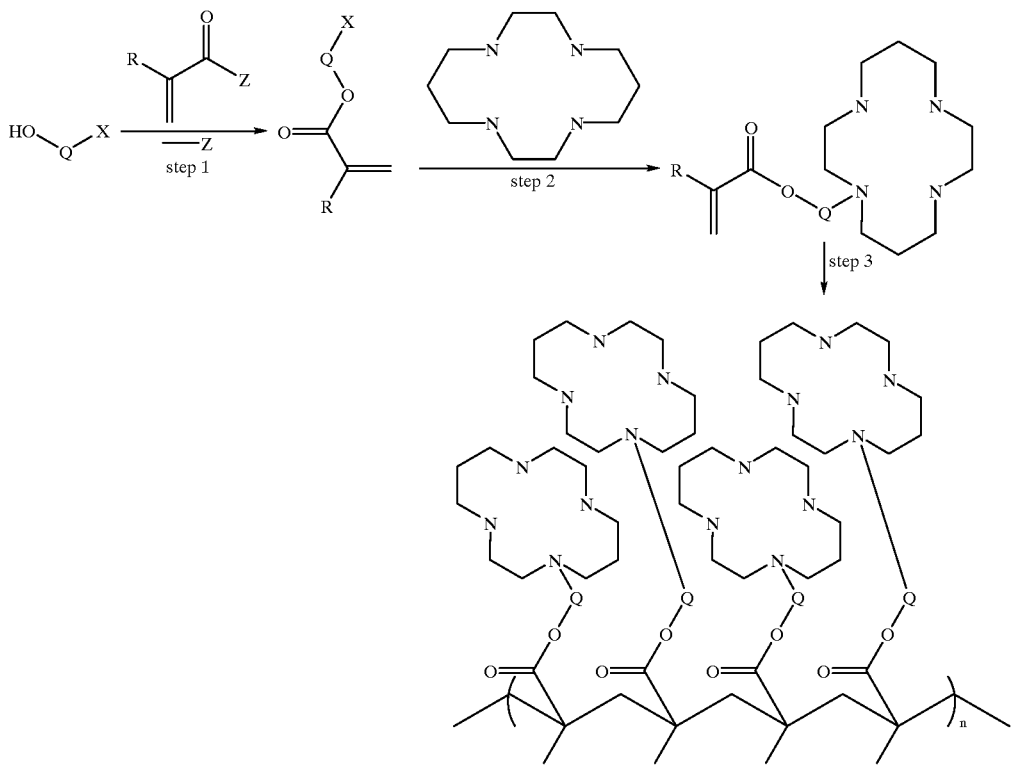

where X, Z, Q, and *n* are as defined above. Here, substitution occurs at the nitrogen. Where the heterocyclic coordination site is divalent, such as with S or O, SN2 substitution will instead occur at a carbon within the alkylene bridge of the heterocyclic chelating group.

The high metal chelating capability of the azamacrocyclic and azaacyclic molecules such as 1,4,8,11 tetraazacyclotetradecane (cyclam), 1,4,7,10 tetraazacyclododecane (cyclen), 1,4,7,11-tetraazaundecane, 1,4,7,10-tetraazadecane, oxocrown ethers and oxa-aza crown ethers, thia crown ethers, thia-oxo crown ethers, thia-aza crown ethers, permits metal chelation in aqueous and non-aqueous systems. Incorporation of these chelators in polymers through covalent attachment limits contamination of the medium, which could occur by direct addition of the chelator, since the polymers have lower overall intrinsic solubility. Preparation of acrylates, methacrylates, acrylamides or acetylene polymers that contain these chelators covalently attached, or, immobilization of the chelators on polymers, improves the efficiency of metal removal by increasing the numbers of the chelators available.

Polymers made according to the present invention are useful in chelating most transition metals, depending upon the chelating group. Polymers according to the present invention in which the chelating group is heterocyclic, with nitrogen at the coordination sites, are particularly useful in the removal of copper.

Although the present invention can chelate and remove metals ions across a wide variety of environments, the method of the present invention is particularly useful in removing metals (particularly heavy metals and transition metals) from hydrocarbons. For metal ion removal, the polymer of the present invention may be contacted in any manner with the material from which the metal is to be removed. Typically, the material from which the metal ion is to be removed is a fluid, i.e., a liquid or vapor. One convenient method of using the present invention is to contact a surface coated with the polymer of the present invention with the material from which the metal ion is to be removed.

An added advantage of the present invention is that the solubility of the molecular system can be tailored to suit the needs of the application. This can be accomplished by altering the carbon chain length i.e. the number of carbon atoms attached to the molecule. Another advantage of the method is that the preparation of the materials is achieved from readily available starting materials and involves a small number of steps. A further advantage of these materials is that depending on the shape and size of the chelator, the intrinsic porosity of the material can be adjusted. The porosity can be further adjusted by employing and exploiting the properties of other cross-linking agents such as divinylbenzene.

Having described the invention, the following examples are given to illustrate specific applications of the invention including the best mode now known to perform the invention. These specific examples are not intended to limit the scope of the invention described in this application.

EXAMPLES

Preparation of methacrylate monomers of 1,4,8,11-tetrazacyclodecane (cyclam), with variable carbon chain lengths of from 2 to 8, and homopolymerization of same 1 mmol of a bromoalcohol having the formula, OH—$(CH_2)_x$Br, where x is an integer from 1 to 100, were reacted with 1 mmol methacrolyl chloride in the presence of pyridine in ether or chloroform. After quenching the reaction in water, the bromomethacrylates were isolated by extraction into methylene, chloroform, or ether as pale yellow to colorless light sensitive oils in 75–90% yields. Reaction of these oils with an 8 fold excess of cyclam in chloroform produced the methacrylate esters of cyclam in 70–80% yields. Free radical polymerization was induced by adding 0.1–5% 2-2'-azobis(2-methylpropionate) (AIBN) to the monomer in the minimum amount of tetrahydrofuran or toluene and heating the solution for 3 to 24 hours at 50° C. to 110° C. The polymerized product was then characterized by gel permeation chromatography on polystyrene. The molecular weight of the polymers ranged from about 5K to about 200K. The product was a viscous syrup/semisolid.

Obviously, many modifications and variations of the present invention are possible in light of the above teachings. It is therefore to be understood that, within the scope of the appended claims, the invention may be practiced otherwise than as specifically described.

What is claimed is:

1. A method of making a polymer having chelating groups covalently bound thereto, comprising the steps of:

reacting a first compound, said first compound having the structure:

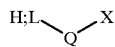

with a second compound, said second compound having the structure:

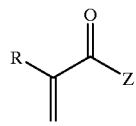

to produce a third compound having the structure:

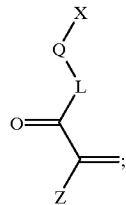

reacting said third compound with a multifunctional chelator, EH, to produce a monomer having the structure:

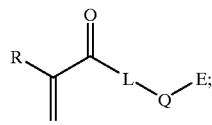

polymerizing said monomer to provide a polymer having the structure:

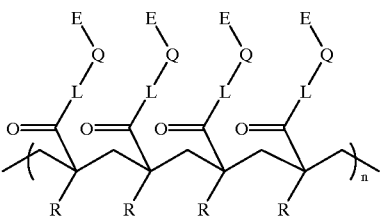

wherein X is selected from the group consisting of halide, acetate, brosylate, tosylate, nosylate, azide, nitrate, and carbonate: Z is selected from the group consisting of halide, acetate, brosylate, tosylate, nosylate, azide, nitrate, and carbonate: E is a multifunctional chelating group having at least two coordination sites, each coordination site being a heteroatom joined to a neighboring coordination site by an alkylene bridge of about 1 to about 100 carbon atoms; L is oxygen, nitrogen, or sulfur; Q is an aliphatic group having 1 to about 200 carbon atoms; i is an integer having a value sufficient to provide electrical neutrality; R is hydrogen, an unsubstituted unbranched hydrocarbon group, an unsubstituted branched hydrocarbon group, a substituted unbranched hydrocarbon group, or a substituted branched hydrocarbon group, and n is an integer having a value of at least one.

2. The method of claim 1, wherein X is the same as Z.

3. The method of claim 1, wherein E is selected from the group consisting of:

diethylenetriamine, triethylenetetraamine,

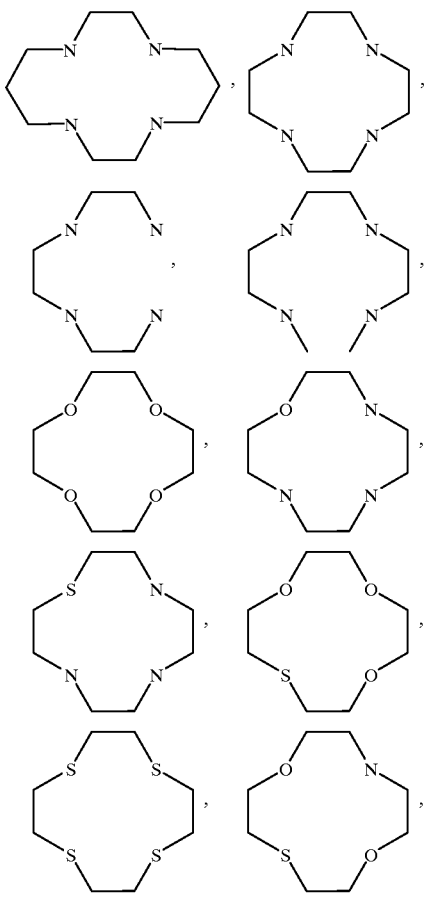

-continued
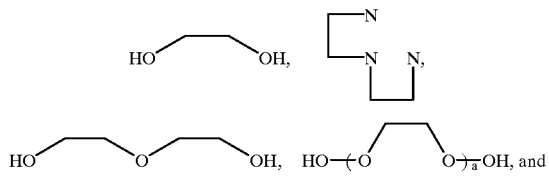
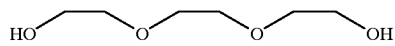
where a is an integer greater than one.
4. The method of claim 1, wherein R is a methyl group.
5. The method of claim 1, wherein R is oxygen.
6. The method of claim 1, wherein *n* is 2–8.
* * * * *